United States Patent Office 3,325,938
Patented June 20, 1967

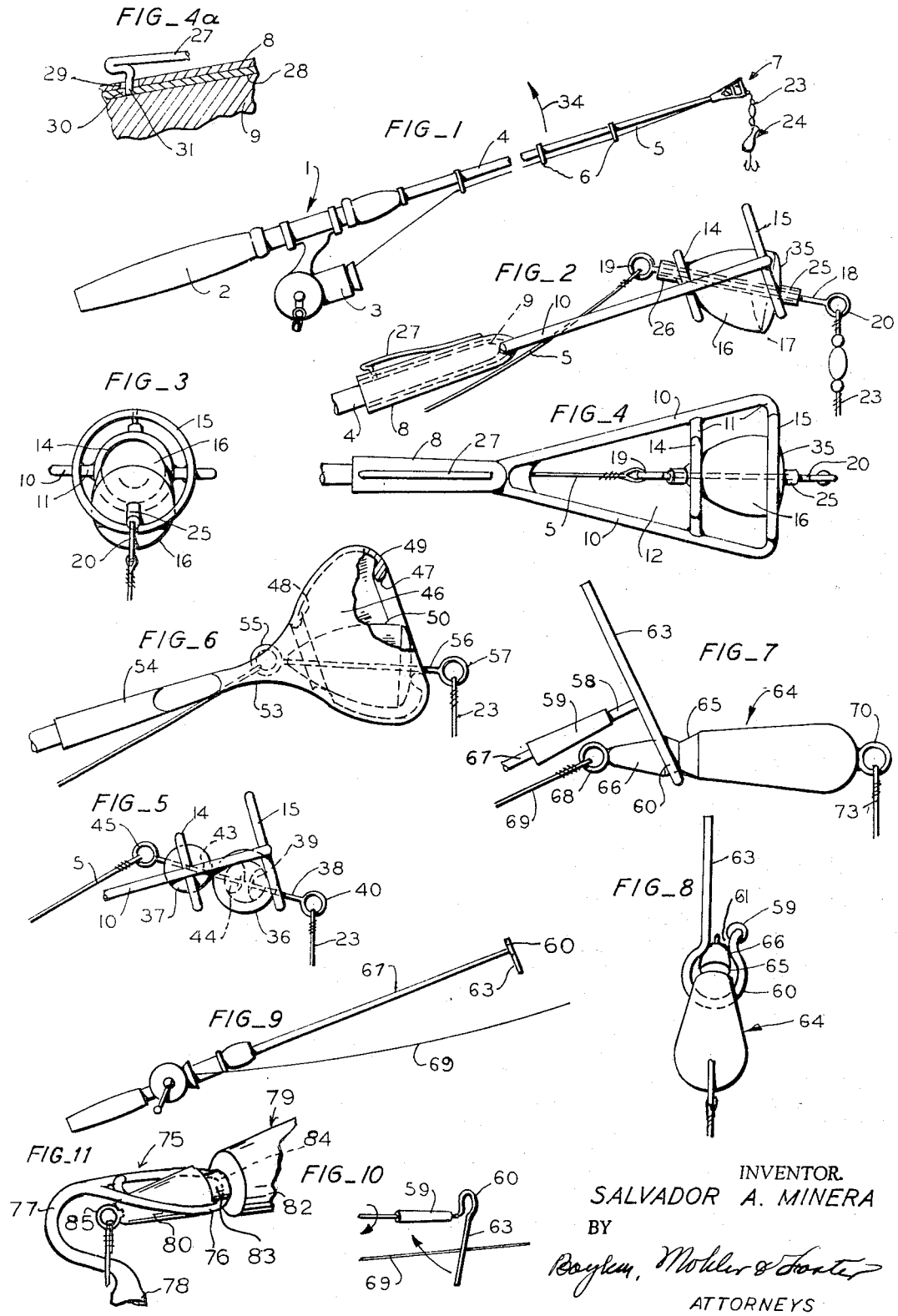

3,325,938
FISHING DEVICE AND COMBINATION
Salvador A. Minera, 1921 Taraval St.,
San Francisco, Calif. 94116
Filed Nov. 19, 1964, Ser. No. 412,425
8 Claims. (Cl. 43—18)

This invention relates to a fishing device for use with a fishing rod and line, and particularly with a rod equipped with a spinning reel.

One of the objects of the invention is the provision of means for insuring a release of the line in a casting or similar operation at substantially the optimum point for distance and accuracy.

Another object of the invention is the provision of cooperating means respectively on a fishing rod end on the line for automatically releasing the lure, weight, or whatever is on the end of the line, including the hook or hooks, in a casting operation at the optimum point for the desired distance and for accuracy.

An added object of the invention is the provision of a tip guide on a fishing rod that is coaxial with the rod to enable casting the line substantially free from causing rotation of the pole, and which tip guide is formed to coact with an element or member on the line for automatically holding said element until the end of a casting operation, when it is automatically released.

A still further object of the invention is the provision of an improved guide for the tip of a rod, which guide as adapted to cooperate with a member secured on the outer end portion of the fishing line for automatically engaging and holding said member against release during a casting operation until the pole has reached the point in its movement at which the fishing line should be released to obtain the optimum distance and accuracy, and upon the pole reaching said point, said member and the line are automatically released.

In explanation of the foregoing, assuming a spinning reel is on the rod, the fishing line extends through a plurality of coaxial ring guides secured to the pole at spaced points along the latter, which guides are offset to the same side of the pole as the reel. A guide ring is also secured to the tip of the rod. The latter normally has an elongated shank formed in one end with a socket thereby providing a socket member that receives the tip, and the tip is cemented in the socket with a cement that may be readily softened by heat from a match or the like for removing the tip for replacement. The present invention includes a special line guide having a conventional shank and socket to enable readily securing it on the tip of a rod in place of the conventional ring.

In a spinning reel the line is free to move off one side of the reel axially of the latter in a casting operation. To make the cast, the operator frictionally holds a portion of the line between the reel and the tip of the rod by pressure of the thumb or a finger against the line and pole at a point adjacent to the reel. When the outer end of the pole is quickly swung forwardly to make the cast, the operator must release the line holding pressure of the finger against the line at exactly the right time to insure the desired accuracy and distance.

Irrespective of how experienced the fisherman may be, the moment at which the line is reelased may vary relative to the position of the pole, and as a consequence the distance to which the outer end of the line (which includes the bait, lure, weight, etc.) will vary. A faulty release many times results in the line becoming entangled in overhead branches or in bushes, or in a wasted cast. Obviously, if the rod substantially points in the direction desired when the line is released, there will be a minimum of friction between the line and the guides, and the energy applied in swinging the pole will be most effectively transmitted to the lure, weight and/or bait on the outer end of the line to carry the line outwardly.

With the present invention the line is automatically released at the desired moment in making the cast and upon reeling in the line, it will automatically be held at the end of the reeling operation for automatic release on a subsequent casting. The distance to which the outer end of the line, and whatever type of bait or lure is thereon will be cast, will depend upon the force used in moving the rod in the casting operation, and the moment when the casting operation ends, but the release of the line will automatically occur at substantially the right time. This assumes, of course, that the fisherman ceases the swing of the rod in the casting operation at the desired point. The energy applied to the rod and the degree of movement of the rod as well as the direction of movement are still features under the control of the fisherman.

Whether the reel is of the conventional bait casting or spin casting type is immaterial insofar as the present invention is concerned, provided a casting operation is employed.

Other objects and advantages will appear in the description and drawings.

In the drawings,

FIG. 1 is a side elevational view of a fishing rod assembly incorporating the present invention.

FIG. 2 is an enlarged side elevational view of one form of the invention in which the rod is in a position preparatory to casting.

FIG. 3 is an end elevational view of the device shown in FIG. 2.

FIG. 4 is a top plan view of the assembly shown in FIG. 2.

FIG. 4a is a greatly enlarged fragmentary sectional view showing a means for releasably securing the guide tip to the rod.

FIG. 5 is a modification of a portion of the device shown in FIG. 2.

FIG. 6 is a still further modification of the invention shown in FIGS. 1–5.

FIG. 7 is another modification of the invention shown in FIGS. 1–6.

FIG. 8 is an end elevational view of the device shown in FIG. 7.

FIG. 9 is a reduced size elevational view of a fishing pole illustrating the manner of operation of the invention shown in FIGS. 8, 9.

FIG. 10 is a fragmentary, reduced size perspective view showing the device of FIG. 9 retrieving a fishing line.

FIG. 11 is a fragmentary perspective view of a further modification of the invention shown in the preceding figures.

In detail, FIG. 1 shows a fishing rod assembly, generally designated 1. The conventional part of this assembly is a handle 2, reel 3, rod 4, fishing line 5, and guides 6. The latter are substantially coaxial rings secured to the rod at spaced points therealong, and offset to the same side of the rod as reel 3. The line 5 extends from the reel 3 through guides 6 to the tip of the rod, which tip is generally designated 7 and embodies an important part of the present invention. This tip will be called a "tip guide" to distinguish it from the other guides, and from the tip of the rod itself.

A conventional tip guide comprises a single ring secured on the outer end of an elongated socket that is open at the end opposite to the ring, and the tip of the rod is secured in said socket by cement. This cement can be readily softened by heat from a match or the like to enable removal of the tip guide, and replacement thereof. The socket member supports the conventional ring in a position offset to the same side of the pole as the other rings or guides, and in a plane that is at an angle of about 75° relative to the longitudinal axis of the pole.

In the present invention the tip guide is preferably provided with a socket portion 8 (FIG. 2) into which the tip 5 of the pole 4 is secured.

Rigid with the socket member or portion 8 are arms 10 (FIG. 3) that are connected at one of their ends to said socket member 8, and their opposite ends are respectively connected with one of the sides of an outer ring 15 and with an inner ring 14 that is spaced between the outer ring and socket member 8. Said rings are preferably coaxial with each other and with rod 4 and are preferably spaced from arms 10 by projections 11 (FIG. 4) extending toward each other from arms 10 and which are integrally connected with the arms and rings. Thus, projections 11 also function as spacers between the arms and rings.

The words "inner" and "outer" as used herein will designate positions relative to the socket portion 8 or to handle 2, the inner guide ring being nearest to the socket portion and to handle 2, and the outer ring being most remote therefrom.

The inner ring 14 of the tip guide is of smaller diameter than that of the outer ring, and while only two arms 10 are shown in FIGS. 2–4, it is obvious that any desired number may be used to give the desired support to the rings, and while the invention is not to be restricted as to dimensions, in an example of a popular size for trout fishing the inside diameter of the outer ring may be approximately three eighths of an inch and that of the inner ring approximately three sixteenths of an inch. For surf fishing and where heavy lines are used, the dimensions will be greater, and three or four arms 10 may be used. In any event, it is preferable that the area 12 between the socket member and the inner ring be clear with adequate space between the arms 10 for the line to pass to the guides 6 and for the projection of line holding and releasing means on the line therethrough, as will now be described.

FIGS. 2–4 show an element 16 of generally frusto-conical shape, which element may be a weight, or may be of any other suitable material. Where it is a weight it may substitute for the conventional weight used on lines on bait casting or spinner casting rods, for fresh water or surf casting.

The element 16 may be formed with a central open ended bore or passageway 17, and a wire or line 18 may extend through said passageway and be formed with loops 19, 20 at its opposite ends to function as stops for retaining the element 16 between the loops, and loop 19 may connect with the outer end of fishing line 5, while loop 20 may be secured to a line 23 or leader that carries the bait, hooks, lure, or any combination thereof, generally designated 24 (FIG. 1).

The present invention is not particularly concerned with the make-up or the arrangement of the lures, hooks, bait, etc. that are at the outer end of the fishing line itself. The important feature is that nothing is secured on or to the fishing line that would interfere with freely drawing such element through the outer ring 15 when the line 5 is reeled in to bring the lure, hooks, etc. to the outer end of the rod.

In the present instance, the element 16 may be of plastic and function as a float, or a lure, or both, in which event it is usual to secure sinkers or a weight to the line 23, including any other desired elements, since line 23 may be fairly long. On element 16 itself may be the weight, and tubular coaxial projections 25, 26 at the larger and smaller ends may be integral with the body 16, with the line or wire 18 slidably extending through said extensions.

Usually the socket member 8 is cemented onto the tip of the rod, which cement is readily softened by heat from a match or the like to remove the guide on said socket member.

In the present instance a spring arm 27 may be secured at one end to the socket member 8 and the tip end of rod 4 may have a metal cap 28 (FIG. 4a) secured thereto in which there is a side opening 30 in registration with an opening 29 in the socket member, and a lateral extension 31 on the free end of spring arm 27 is adapted to snap into said openings to releasably hold the socket member 8 onto the rod. This free end of the spring arm may readily be sprung outwardly by engagement with the fingernail of the user for freeing the socket member 8.

The maximum diameter of the element 16 is less than the inside diameter of the outer ring 15 but substantially greater than that of the inner ring 14, so that upon reeling in the line the inner ring 14 will function as a stop for the line upon engaging the inner ring. In the form of the invention as seen in FIGS. 2–4, the projections 25, 26 will project through the outer ring and the inner ring, which is preferable, but not essential.

The length of element 16 between the tubular extensions 25, 26 is approximately the distance between rings 14, 15 and loops 19, 20 may function as stops to engage extensions 25, 26 to prevent lines 5, 23 from being pulled through the element, although it is to be understood that said loops may, if desired, be rigid with the element, and the tubular extensions retained or omitted, as desired, but lines, 5, 23 will still connect with said loops, with suitable and conventional swivel couplings in either or both lines to enable the lines to rotate relative to the loops, or for the loops to swivel.

When the element 16 is drawn through the outer ring 15 in a reeling operation, and further movement is stopped by engagement of the element with the inner ring 14, the outer end of the body of the element will have cleared the outer ring.

In FIG. 1 the rod 4 is generally in a static position after being reeled in. As soon as the larger diameter end of element 16 clears the outer ring, and the reeling of the line ceases, the outer end of element 16 will drop. Tubular extension 25 may function as a stop to support the outer end of the element in the position shown in FIG. 2. This relative position of the rod, guides and element 16 relative to each other is also approximately the normal position in starting to cast the line. In other words, the rod will be between horizontal and vertical with the guides 6 and a portion of rings 14, 15 at the underside.

In the position shown in FIG. 2 the line 23 and the usual fishing members thereon will tend to swing the rear end of the element 16 upwardly, but the rear end of the element 16 or tubular projection 26 will prevent the rear end from moving out of the inner ring 14.

The rod is then swung forwardly, or in the direction of arrow 34 (FIG. 1). During this swinging movement the element 16 will be held substantially in the position shown in FIG. 2, relative to rings 14, 15 by the inertia of the rod and by ring 15, but instantly, at the end of the swing, the outer end of element 16 will move in the direction of the rod to shoot outwardly through the outer ring under the influence of contrifugal force. At the end of the swing, the outer end of the rod may be pointing generally in the direction in which the cast is to be made. The time of release is substantially at the point at which the swing of the rod ceases, which includes the succeeding "whip" or flexing of the rod in the direction of the swing, so that all of the energy applied by the fisherman will be transmitted to the element 16 and to the lure, bait, etc. connected therewith outwardly of the outer end of the rod at the moment of the release.

The axially outwardly facing surface 35 of the element 16 is preferably convexly curved or slanted to cause it to commence its outward movement while the rod is still at approximately the end of the casting movement, and when the element is reeled in the curved or slanted outer end surface facilitates the automatic re-positioning of the element as seen in FIG. 2.

Referring to FIG. 5, instead of the element 16, an outer spherical bead 36 is shown, and a smaller inner bead 37 is shown. The larger bead 36 will freely pass through the outer ring 15 but not through the inner ring, while the latter may slightly project through the inner ring during a casting operation. While these beads may be supported on a wire or the like, such as wire 18 in FIG. 2, the larger bead 36 may function as a swivel coupling by structure common in the art, such as by providing a wire 38 with an enlargement 39 within bead 36 so the wire 38 may be held to bead 36, but swivel about its axis. The outer end of wire 38 may carry a loop 40 for securing the line 23 thereto.

Wire 43 is similar to wire 38 and extends through bead 37 and into bead 36, and it also has an enlargement 44 within the latter bead so the wire 43 may rotate relative to the latter. Loop 45 is adapted to be connected with the line 5.

Bead 36 may be colored, and of any suitable material, and may function both as a lure and swivel as well as a line holding and releasing means.

In the position shown in FIG. 5 the bead 36 functions in the same manner as the element 16 insofar as holding the line against release until the swing of the rod in a casting operation ceases, and the wire 38 performs the function of the projection 18 in limiting the downward movement of the bead as well as supporting the latter in holding relation to the outer ring 15.

The inner bead 37 performs substantially the same function as the projection 26, but if the bead 37 were omitted, the wire 43 would perform the function of retaining the bead 36 between the rings 14, 15, since the wire 43 would project through ring 14. The use of the inner bead 37 supports the line holding means closer to a released position than were it omitted and the wire 43 relied upon, particularly since wire 43 might swing to an angle relative to the central axis of the bead 36 should the passageway in bead 36 for wire 43 become enlarged through wear.

FIG. 6 varies from the form of the invention shown in FIG. 5 in that a generally frusto-conical open-ended shell 46 extends between and around annular outer and inner rings 47, 48, with said rings being rigid with the shell around the end openings in the latter, defining the sides of said openings. The marginal portion 49 that connects with the outer ring 47 extends axially outwardly of the later to enable the generally frusto-conical element 50, which is similar to element 16, to seat in substantially the same position relative to said rings 47, 48 as is shown in FIG. 2.

Extensions 53, rigid with said shell 46, extend from the inner open end of the latter to the socket member 54 to provide passageways between the socket member 54 and the shell for passage of line 5 to the loop 55 that is on the inner end of wire 56 that, in turn, extends through a central passageway in element 50. Wire 56 projects outwardly of the shell 46 through ring 47, and said loop is adapted to be connected to line 23.

The dimension and shape of element 50 may be similar to the dimension and shape of element 16. However, element 50 is shown as being without the projections 25, 26 that are shown in FIG. 2.

The manner of operation of the structure disclosed in FIG. 6 is substantially the same as the manner of operation of the invention as shown in FIGS. 1-3. It should be noted that the form of invention shown in FIG. 2 would perhaps be lighter in weight than the form shown in FIG. 6, and would be quieter than the form shown in FIG. 6 where considerable force is applied to the casting operation, due to the skeleton-like form of FIG. 2.

FIGS. 7–10 show a form of the invention that operates substantially in the same manner as the device of FIGS. 1–6, with additional advantages where the fisherman desires to reduce the frictional losses due to the line passing through the guides when a cast is made.

In this form of the invention, a straight wire shank 58 may be rigid and coaxial with a socket member 59 that substantially corresponds to socket member 8, and said shank extends outwardly of of the closed outer end of said socket member. The wire of which said shank forms one end portion thereof is formed to provide an annularly extending portion 60 at the outer end disposed in a plane that is normal to the shank, but said portion 60 is open between the outer end of said shank and the terminating end of the annular portion 60, as at 61 (FIG. 8). The wire forming said portion 60 continues in the same plane as portion 60 to form a straight arm 63 that terminates at a substantial distance spaced outwardly of portion 59.

In the present instance, the line holding and releasing member may be a weight, float or lure or both a float and lure, if desired, since it is preferably elongated and may be hollow. In fact, if hollow, it may even carry bait or a fish attraction substance adapted to be progressively released into the water.

The elongated line holding element in FIGS. 7, 8 is generally designated 64 and is progressively tapered from one end to the other and spaced from the smaller diameter end is an annular outwardly opening V-shaped groove 65.

The inner end portion 66 of the element 64 between the groove 65 and the inner end of the element is adapted to project through the opening defined by the portion 60, and when the element is tilted so that the side of portion 60 opposite to opening 61 is seated in groove 65, with the end portion 66 of element 64 alongside shank 58, or socket member 59, the diameter of such inner end portion 66 is such that it cannot swing upwardly through the space 61, but will be held in the position shown in FIG. 7.

When the rod 67 is in a casting position, the position of the wire holder for the element 64 is substantially as shown in FIG. 7, with arm 63 pointed in the direction in which the rod 67 is to be swung.

When the rod is swung to make the cast, and is then stopped, the element 64 will be cast under centrifugal force in substantially the same manner as the elements 16, 50 or the bead 36.

A loop 68 connected to the inner end of element 64 is adapted to connect with the outer end of the fishing line 69, and a similar loop 70 connected to the element 64 at its larger diameter end may be connected with the line 73 that carries other lures or hooks or a weight.

The rod 67 in this instance has no guides for the line; hence, when the element 64 is released, the line will leave the rod except for the reel 74 and there will be no loss in the momentum by reason of frictional losses other than may occur at the reel, which is negligible in a spinning reel in which the line leaves the outer periphery of the drum instead of passing through a central opening in a closure plate.

After the line has been cast, it may readily be picked up to pass through the portion 61 of the tip guide by lowering the latter alongside the line so that the arm 63 extends transversely across one side of said line, and then rotating the arm as indicated in FIG. 10 to engage the line so the latter will slide into the portion 60 when arm 63 projects upwardly, and thereafter the line 69 may be reeled in the usual manner and as soon as the inner end portion 66 of the element or body 64 enters the space outlined by portion 60 and the larger diameter end is stopped (which occurs approximately when the groove 65 is over one side of portion 60) the assembly will be ready, automatically, for another casting of the line.

Another modification of the invention is shown in FIG. 11 in which a tip guide 75 is shown in the form of a centrally open loop or annulus 76. This loop is rigid with, but offset laterally to one side of the shank 77 that connects one side thereof with the socket member 78. Said socket member is similar to the other socket member and secures the loop to the tip of the rod. It is important to note that the loop extends at a right angle to the axis of the socket member, and the rod, and is not inclined relative to said axis as is done with the conventional tip guides and may be elongated or generally egg shape.

The element 79 shown in FIG. 11 is similar to the element 64 in FIG. 7 in that it is provided with an inner end portion 80 that will readily pass through the loop 76 and an outer end portion 82 that will not pass through the loop. A neck portion 83 of lesser diameter than that of either the inner or outer end portions where the latter connect with said neck portion defines the bottom of an outwardly opening annular groove in which the outer end 84 of loop 76 is seated when the inner end portion 80 is moved through the loop.

The inner end portion 80 is generally frusto-conical in shape with its smaller diameter end defining the inner end of the element 79, and an eye 85 may be secured to the terminating inner end of said element for connection with the portion of the fishing line that extends along the rod to the reel. It is also pertinent to note that the loop 76 must be offset in this instance a sufficient distance from the shank portion 77 that connects with the socket member 78 to the socket member for the inner end 80 of the element 79 including the eye 85. The socket member 78 may be substantially in axial alignment with the annulus or member 76 which means that the shank 77 would be formed generally as indicated, although were the shank portion to extend straight downwardly to the socket member, similar to the shank 58 in FIG. 7 the device would be operable, except that after casting, the rod would preferably be turned so that the guides including loop 76 would be in a position at the lower side of the rod, whereas if generally coaxial with the rod, as in FIGS. 1–6 and 11 the rod need not be turned after casting to bring it to the position shown in FIG. 1. Upon reeling in the element 75, the element 75 will automatically be reconnected with the member 76. The action in casting would be the same as with the device of FIG. 1, the bait or line assembly being connected with the ring (not shown) that is on the outer end of the inertia member.

While it is customary to connect a line, such as at 23 (FIGS. 1–6) or 73 (FIG. 7) with the element on the line that releasably engages the annulus or tip guide, until released at the end of a casting movement, it is obvious that such elements may themselves be bait carriers or lures, or may be formed to simulate bait, and the hooks may be carried thereby.

From the foregoing it is seen that the element 16, or any of the elements or members illustrated that is adapted to be propelled in a similar manner, may be called inertia means, or an inertia element, and the tip guide that is on the outer end of the rod may be properly called a propelling means or member.

Apart from the fishing rod with the reel thereon, in its broadest sense the present invention comprises inertia means adapted to be secured on the outer end of a fishing line, such inertia means being the elements 16, 50, 64, 36–43, 64, 79 and equivalents thereof.

The tip guides illustrated may be called propelling members, and in the drawings, each of these generally comprises an annulus such as at 15, 47, 60, 76 and securing means rigid therewith, such as the socket portions, for securing the annulus to the outer end of the rod for supporting the annulus stationary on the rod in a position spaced from the outer end of the latter with its axis substantially parallel with the axis of such rod.

The above said inertia means includes the line securing means, such as the rings 19, 45, 55, 68, 85, movable through the annulus from the side of the latter remote from the socket portion to a position between said annulus and such rod for securing thereto one end of the portion of the finishing line extending from the reel on the rod.

The annulus or propelling member and the inertia means include engaging portions therein in releasable engagement with each other when the annulus is on the rod and the end of the inertia means adjacent to the line securing means including the latter, are between the annulus and the rod. Such portions clearly include the outer end surfaces of the elements 16, 36, 50, the generally axially outwardly facing shoulder surfaces at one side of groove 65 (FIG. 7); the annular groove shown in FIG. 11 between the inner and outer ends 80, 82 of the member 79, and a side of the annulus 15, 47, 60, 76. These engaging portions releasably hold the inertia means and annulus together against separation from each other under the influence of centrifugal force during a casting movement of the rod with the inner end of the inertia means secured to the fishing line and positioned between the annulus and the rod.

The portion on the inertia means, as above described, that is in holding engagement with a portion of the annulus is responsive to movement out of holding engagement with said portion of the annulus under the influence of the inertia developed in said inertia means during the casting movement of the rod for movement outwardly of said rod under the influence of said centrifugal force.

It has been mentioned that the release of the inertia member is atuomatic, and its re-positioning in the propelling member is also automatic when the line is reeled in. This enables the fisherman to wear gloves while fishing, which is not only a comfort to the fisherman on frosty mornings, but on such mornings the fingers are stiff, making it even more difficult to release the line at the proper moment, since gloves cannot be used successfully where the line is held by a finger up to the movement when the cast is made.

It is recognized that some spinning reels now manufactured have manually actuatable members that must be either manually released or manually pressed at the desired moment to release the line. Such mechanisms are quite expensive and they still have the disadvantage of being wholly dependent upon the skill of the fisherman in actuating them at the right moment.

It is obvious, of coruse, that the inner end portion 66 of the element 64 is similar to the inertia member or elements 16 and 50 or 80 in FIGS. 1, 6, 7 and 11 and any of them are usable with the different propelling members. The smaller bead of the type shown in FIG. 5 functions to facilitate the movement of the larger bead through the outer loop, and in some instances the loop 45 or the length of the wire 38 projecting rearwardly from a single bead may engage ring 14 or the inner end of loop 76 (FIG. 11) during a cast, the same as occurs with the inner end of portions 66 or 80 of FIGS. 7, 11.

The form shown in FIGS. 9, 10 is particularly suited where frictional losses such as the drag of the line through the guides, is noticeably objectionable, as when the line is quite light in weight, or heavy, and the form shown in FIG. 11 may be used where the rod and line are quite light in weight.

There are other modifications of the invention that would operate generally in a manner similar to the invention as specifically illustrated herein, therefore it is understood that the scope of the invention is to be limited by the appended claims.

I claim:

1. A fishing device for use in casting a fishing line from a rod having a handle at one end, and a reel adjacent thereto for said fishing line, and a tip at its opposite end;
   (a) an inertia member adapted to be secured to the outer end of such line and having an outer projection in conjunction therewith;
   (b) a propelling member having an inner end including rod-securing means for securing said inner end to said tip, and an outer end opposite to and spaced from said inner end;
   (c) supporting means on said propelling member for loosely supporting said inertia member thereon between said inner end and said outer end, said supporting means including a first element stationary on said propelling member extending across and in engagement with the surface of said inertia member that faces toward said outer end of said propelling member and in engagement with said outer projection and a second stationary element supporting a rearward portion of said inertia member for holding said inertia member against separation from said propelling member under the influence of centrifugal force during swinging of said rod and tip in a casting movement before the end of said movement;

(d) said inertia member being freed from said supporting means for movement in the direction of said casting movement under the influence of momentum at the end of said casting movement.

2. In a device as defined in claim 1;
(e) said outer end of said propelling member including a ring-like portion rigid with said propelling member having a central opening substantially coaxial with said rod-securing means and with the longitudinal axis of said rod and tip when said rod-securing means is secured on said tip, and which opening is sufficiently large for said inertia member to freely pass therethrough at the end of a casting movement;
(f) said first element being a portion of said ring-like portion;
(g) said projection on said inertia member extending through said opening and being held by the part of said ring-like portion comprising said first element during said casting movement.

3. In a device as defined in claim 1;
(e) said first and second stationary elements on said supporting means including coaxial ring-like portions rigid relative to each other and axially spaced apart and providing an outer ring-like portion and an inner ring-like portion with said outer ring-like portion having a central opening through which said inertia member is adapted to freely pass and with said inner ring-like portion having a central opening insufficient to pass said inertia member therethrough;
(f) said rod-securing means being coaxial with said inner and outer end ring-like portions and spaced outwardly therefrom at the side of said ring-like portions adjacent to said inner ring-like portion for supporting said ring-like portions substantially coaxial with said rod when said rod-securing means is secured to said tip;
(g) said inertia member comprising a body including said outer projection and an inner projection extending oppositely outwardly from opposite sides of said body with said outer projection loosely extending into said outer ring-like portion and said inner projection loosely extending into said inner ring-like portion for loosely supporting said body between said ring-like portions;
(h) said inner projection including inner line-securing means for securing thereto the outer end of the part of said fishing line adapted to extend therefrom to said reel when said rod-securing means is secured to said tip and said outer projection including outer line-securing means for securing thereto the part of said fishing line adapted to carry the hooks and lure.

4. In a device as defined in claim 3;
(i) a wire-like connector rotatably extending through said inertia member body connecting said inner and said outer line-securing means whereby the parts of said line extending outwardly from said body and projections will be connected independently of said body, each of said line-securing means being of sufficient size to engage the outer ends of said projections on said body to provide stop means for holding said body between said line-securing means.

5. In a device as defined in claim 3;
(i) said body of said inertia member being generally frusto-conical having a central axis with said outer projection projecting outwardly of substantially the center of the larger diameter end of said body and said larger diameter end having an end surface extending radially outwardly of said outer projection, with said surface engaging said first element being a portion of said end surface adjoining said outer projection.

6. In combination with a fishing rod having a reel thereon at one end thereof and a tip at its opposite end, and a fishing line on said reel extending to said tip;
(a) a propelling member secured to said tip projecting outwardly thereof axially of the longitudinal axis of said rod;
(b) an inertia member comprising a body having an inner end and an outer end provided with a projection in conjunction therewith;
(c) supporting means on said propelling member supporting said body loosely thereon for movement therewith during a casting movement of said tip in an arc in one direction, with said inner end of said body adjacent to said tip and said outer end of said body adjacent to the outer end of said propelling member relative to said tip;
(d) said supporting means including first holding means stationary relative to said propelling member extending across and in engagement with said outer end of said body and in engagement with said projection and second holding means supporting a rearward portion of said body for holding said body against movement outwardly of said rod and tip under the influence of centrifugal force during said casting movement and prior to the end of said movement irrespective of the amount of said force developed in said body during said movement;
(e) said inertia member being freed from said holding means at the end of said casting movement under the influence of the momentum developed in said body for casting said body from said propelling member under the influence of centrifugal force.

7. In the combination as defined in claim 6;
(f) said second holding means of said supporting means including a ring into which the inner end of said body extends during said casting movement and during movement of said outer end of said body under the influence of momentum to one side of said first holding means at the end of a casting movement for clearing the latter for said casting from said propelling member.

8. In the combination as defined in claim 7;
(g) said inertia member body being generally frusto-conical in shape with said outer end being the large end and said inner end being the small end, with the central axis of said body extending through its inner and outer ends;
(h) said projection on said inertia member being a central projection projecting outwardly from said body and supported on a side of said first holding means, and the end surface of said body at its said large end extending radially outwardly of said projection and said surface being in engagement with said holding means substantially at the juncture between said projection and said surface.

References Cited
UNITED STATES PATENTS

| | | | |
|---|---|---|---|
| 2,591,558 | 4/1952 | Kramer | 43—44.9 |
| 2,709,315 | 5/1955 | Walter | 43—24 |

SAMUEL KOREN, *Primary Examiner.*

W. H. CAMP, *Assistant Examiner.*